United States Patent [19]

Yasuda

[11] Patent Number: 4,807,743

[45] Date of Patent: Feb. 28, 1989

[54] WARE FOR FLAT GLASS PRESERVATION

[75] Inventor: Yoshimitsu Yasuda, Osaka, Japan

[73] Assignee: Nippon Sheet Glass Co., Ltd., Osaka, Japan

[21] Appl. No.: 115,602

[22] Filed: Oct. 29, 1987

[30] Foreign Application Priority Data

Oct. 29, 1986 [JP] Japan .................................. 61-257527

[51] Int. Cl.⁴ ........................ B65D 81/26; B65D 85/48
[52] U.S. Cl. ...................................... 206/204; 206/454
[58] Field of Search ......... 206/204, 205, 449, 454–456

[56] References Cited

U.S. PATENT DOCUMENTS

| | | | |
|---|---|---|---|
| 2,524,162 | 10/1950 | Chavannes et al. | 206/204 |
| 3,063,767 | 11/1962 | Heuer | 206/204 |
| 3,618,755 | 11/1971 | Kean, Sr., et al. | 206/454 |
| 3,657,900 | 4/1972 | Bowser et al. | 206/204 |
| 3,809,223 | 5/1974 | Kendall | 206/204 |
| 3,928,953 | 12/1975 | Mazzoni et al. | 206/454 |
| 4,492,071 | 1/1985 | Gibson | 206/454 |
| 4,681,218 | 7/1987 | Williams | 206/456 |

Primary Examiner—Jimmy G. Foster
Attorney, Agent, or Firm—Lowe, Price, LeBlanc, Becker & Shur

[57] ABSTRACT

A preservation ware for flat glass pieces arranged in strata with interleaving paper sheets comprises a desiccating body put in contact with the respective paper sheets and a sealable wrapper for wrapping the glass pieces, paper sheets and desiccating body in a shielding manner to the atmosphere.

7 Claims, 1 Drawing Sheet

WARE FOR FLAT GLASS PRESERVATION

BACKGROUND OF THE INVENTION

1. Field of the Invention

The present invention relates to a ware for preserving a lot of flat glass pieces arranged in strata.

2. Description of Relevant Art

As an example of conventional measures for preserving flat glass pieces arranged in strata there is such a ware as designated by reference numeral 20 in FIG. 3. In the Figure there is shown a stand 11 made of iron or wood substantially in the form of letter L in side view. There is put on the stand 11 a lot 13 consisting of a plurality of arranged pieces 12 of flat glass in strata, as cleaned and dried in antecedent processes. The glass pieces 12 of lot 13 have interleaving sheets 14 of paper therebetween. The lot 13 is enclosed with a wrapper 15 made, for example, of a polyethylene film, with the bottom left uncovered. Glass pieces 12 are thus protected against deposition of suspended dust in air. The paper sheets 14 function to impede corrosion of glass, prevent scratches, and damp shocks, safeguarding the glass sheets 12 which otherwise may be broken or cracked by collision therebetween, such as when carried together with the stand 11.

In the conventional ware 20, however, the lot 13 is subjected to the atmosphere, particularly at the bottom, so that because of moisture in the atmosphere there first develop, at the lower parts of the glass pieces 12, dew condensation on the surfaces thereof and moisture adsorption by paper sheets 14, Hence, the paper sheets 14 are caused by the moisture to adhere to the surfaces of glass pieces 12, with possible chemical reactions promoted therebetween, thus accompanying an augmented physical transition which produces paper stains on the glass surfaces. Over a long period in which the adsorption and removal of moisture by and from the interleaving paper sheets 14 are alternately repeated, the surfaces of glass pieces 12 are paper-stained with a gradually increasing tendency and have wrinkle patterns of paper sheets 14 transfered thereto so that the glass pieces 12 are made to look less attractive. Further, part of the condensed moisture on the lower parts of the glass pieces 12 is evaporated to spread inside the wrapper 15, and part of the evaporated moisture is recondensed on the glass pieces 12 and paper sheets 14, over their entire surfaces including upper parts, incidentally aggregating on the glass surfaces to form droplets which may drip down on the stand 11, where part thereof may be absorbed by paper sheets 14, so that the preservation environment of the glass pieces 12 gradually becomes worse with respect to humidity. Secondly, such a result leads to a surface weathering of the glass pieces 12, deteriorating the quality.

The present invention has been achieved to effectively solve such a problem of a conventional ware for preservation of flat glass pieces arranged in strata.

SUMMARY OF THE INVENTION

An object of the present invention is to provide a ware for flat glass preservation, in which a plurality of flat glass pieces arranged in strata are possibly kept free from paper stains on the surfaces thereof, and protected from a surface weathering as well, with a maintained quality even in a long custody.

To achieve the object, the present invention provides a ware for preserving a plurality of flat glass pieces arranged in strata, comprising a plurality of paper sheets to be each respectively interleaved between the glass pieces, a desiccating body to be put in contact with the respective paper sheets, and a sealable wrapper for wrapping the glass pieces, paper sheets and desiccant agent in a shielding manner to the atmosphere.

The above and further features, objects and advantages of the present invention will be more fully apparent from the following detailed description of a preferred embodiment of the invention when the same is read in conjunction with the accompanying drawings.

DETAILED DESCRIPTION OF THE PREFERRED EMBODIMENT

Figure 1:
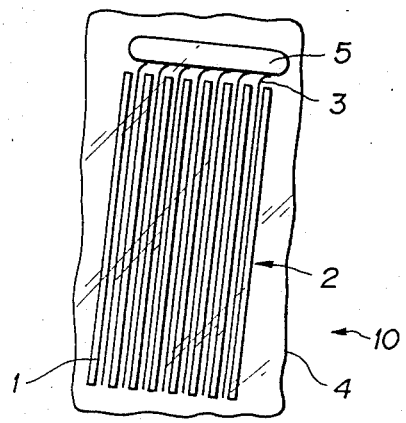
FIG. 1 is a side view of a ware for flat glass preservation according to a preferred embodiment of the present invention.
Figure 2:
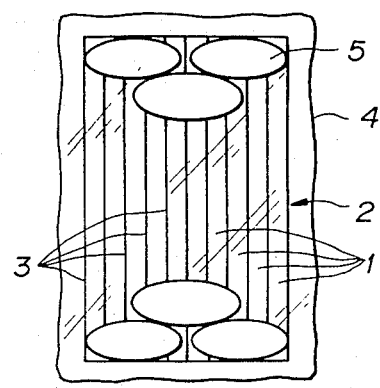
FIG. 2 is a plan view of the preservation ware.

Referring to FIGS. 1 and 2, designated at reference numeral 10 is a preservation ware according to a preferred embodiment of the invention. The ware 10 is for preserving a lot 2 consisting of a plurality of rectangular pieces 1 of a flat glass such as a plate glass, arranged in strata with a rectangular parallelopiped configuration as a whole. The glass pieces 1 have a corresponding number of sheets 3 of paper as interleaves each respectively put in gaps therebetween. The interleaving paper sheets 3 are dimensioned so as to slightly project over the glass pieces 1 at the top side and at least one side thereof. The lot 2 of flat glass is wrapped to be sealed at all the six sides thereof with a wrapper 4 made of a sheet-like material.

The material of wrapper 4 is of a water vapor transmission ratio not exceeding 20 g/m$^2$/24-hrs, and may exemplarily be a polyethylene film such as of a thickness of 30, 40, 50 or 60 microns for general use, although such an example is in no way restrictive. For a special application a multi-laminate paper may be preferred as the material. A number of properly cut pieces of such a material are joined up to form the wrapper 4. The joining may be by a thermal impulse heat sealing or such a hot melt system as using a thermoplastic adhesive, or simply by use of an adhesive tape or the like. The lot 2 has unshown coverings such as of a corrugated cardboard or textile material put on the top, bottom and sides thereof, as well as pads at the corners, to protect the wrapper 4 which otherwise may be torn when rubbed against the eges of glass pieces 1.

As shown in FIGS. 1 and 2, the wrapper 4 holds therein a number of desiccating bodies 5 (which may be pouches) containing an adequate quantity of a desiccant agent such as a silica gel. All the paper sheets 3 are kept at the marginal parts thereof in contact with any of the desiccating bodies 5 which are disposed on the upside of lot 2 in the figures, where the arranged glass pieces 1 take a standing or vertical position. In case the glass pieces 1 are horizontally laid to be pulled up, such desiccating bodies may be disposed alongside of lot 2 in a similar manner.

The necessary quantity of desiccant agent for the lot 2 substantially depends on the total surface area of the glass pieces 1, and is illustratively determined below by calculation under practical conditions:

The lotted glass pieces 1 are quantified by the surface area at one side of an original flat glass to be measured in terms of "case", i.e., one hundred square feet. One case of flat glass thus has a surface area of approx. 9.3 m² at one side, and approx. 18.6 m² in total of both sides.

The desiccant in general has a labelled moisture adsorption capacity specified for an enormous volume of atmosphere. The volume of atmosphere to be confined in the sealed wrapper 4 however is very small, so that for a desiccant put therein the adsorbable moisture amount should be by far less than usually observed.

The desiccant agent (pouched) as the desiccating bodies 5 is now assumed to be a silica gel which can adsorb moisture up to:

$$\text{approx. 7 wt\%} \qquad (a)$$

(of the own weight thereof) under given conditions.

The amount of moisture to be adsorbed by the agent 5 in ware 10 substantially is the sum of the following three:

(1) Condensed moisture on the glass

Under a normal atmospheric condition with a relative humidity of 75%, the glass pieces 1 when put in the ware 10 have on the surfaces thereof a condensed moisture amount of $$1.5 \text{ g/case} \qquad (b).$$

(2) Moisture content of interleaves

The paper to be used as interleaf always contains moisture, the amount of which is controlled approx. 8.0 wt% (of the paper's own weight) under a normal warehouse condition. It however is desired for the interleaving sheets 3 of paper between glass pieces 1 to have a moisture content of 6.5 wt% as an optimum point to avoid the appearance of electrostatic charges as well as the occurrence of paper stains on the glass pieces 1. The paper sheets 3 are dimensioned so as to have a one-side total surface area of 10 m² per one case of glass pieces 1. Assuming the basis weight of paper to be 50 g/m², it so follows that the paper sheets 3 should be deprived of moisture by an amount of $$(50 \text{ g/m}^2) \times (10 \text{ m}^2/\text{case}) \times (8.0 - 6.5)/100 = 7.5 \text{ g/case} \qquad (c)$$

to reduce the moisture content thereof from 8.0 wt% to 6.5 wt%.

(3) Residual moisture on the glass

After the cleaning and drying processes, the glass pieces 1 carry thereon residual moisture the amount of which equals to $$1.5 \text{ g/case} \qquad (d)$$

like (1) above.

The moisture amount the desiccant agent 5 is ware 10 should adsorb per one case of glass therefore is:

$$(b) + (c) + (d) = 1.5 + 7.5 + 1.5$$
$$= 10.5 \text{ g/case} \qquad (e).$$

Hence, the necessary quantity of the agent 5 in ware 10 is:

$$(e)/(a) = (10.5 \text{ g/case})/(7/100) = 150 \text{ g/case}.$$

The paper used as interleaf 3 may fundamentally be of any type, but is preferably rough on both sides, small of resin content, large of basis weight or weight per unit area, and neutral in terms of pH. It will provide a better effect to leave such paper kept in an environmental conditions where the moisture content is controllable substantially within a range not exceeding 6 wt%, before use. The glass 1 will be all the better preserved, if the amount of moisture thereon before preservation is controlled to be still smaller. Incidentally, the flat glass may have metal compounds educed thereon if the paper in contact is acid in terms of pH. Such compounds may however be flushed away with water.

In the preservation ware 10, the lotted flat glass pieces 1 with interleaving paper sheets 3 and desiccant agent 5 are all sealed in the wrapper 4 to shield them from the exterior atmosphere. The desiccant agent 5 as a whole has the weight thereof determined to be substantially proportional to the total surface area of glass pieces 1 as measured in case, and is (pouched to be) in contact with the marginal parts of paper sheets 3, to adsorb therefrom part of contained moisture in the respective sheets 3 as well as condensed or residual moisture on the surfaces of glass pieces 1. Such moisture is transported by a capillary phenomenon through the fibrous tissue of paper. Since the interior of ware 10 is shielded from the exterior atmosphere, the atmosphere sealed therein becomes impotent to provide sufficient moisture for a continued absorption-andrelease action of paper sheets 3. The glass pieces 1 are thus effectively kept free from paper stains as well as from surface weathering. As a result, the ware 10 is permitted to successfully prevent the deterioration in quality of flat glass over a long preservation period. The glass naturally is protected against the deposition thereon of suspended dust in the exterior atmosphere, as well.

More particularly, in a case a multi-laminate paper is employed as the material of wrapper 4, the glass pieces 1 will be maintained quality (Rank A1, see Table-1) over a period of 2.5 years or more, with respect to freedom from paper stain. Even in the case of a polyethylene film, they will have a like quality (Rank A1) maintained over six months or more.

EXPERIMENT

To illustrate such improved effects there was performed a comparison test followed by an evaluation on the basis of an objective inspection.

Figure 3:
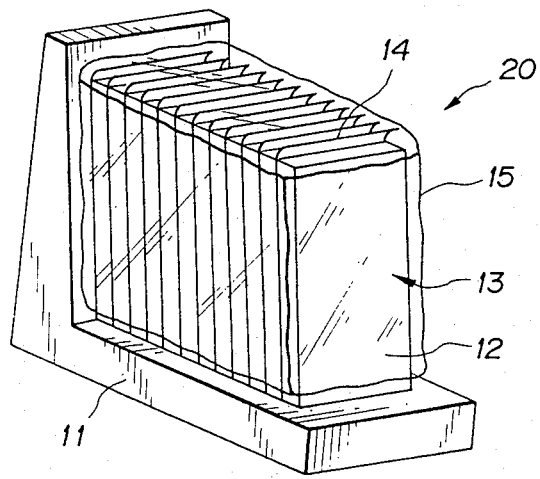
FIG. 3 is a perspective view of a conventional preservation ware, as described.

In the test such a conventional preservation ware as shown in FIG. 3 was compared with a preservation ware according to the foregoing embodiment of the present invention. In this respect, like parts shall be represented by like reference numerals. A polyethylene film 50 micron thick was selected as the material of a wrapper 4. Twenty-four pieces of a plate glass were arranged in strata to constitute each block as the lot 2 for ware 10, and as lot 13 for ware 20. The blocks 2, 13 were set for preservation in wares 10, 20, respectively, to start the test.

After a lapse of one month an inspection was performed, in which each tested glass piece was examined for two items: (1) degree of paper stain adhesion to be ranked by the facility of wipe-off; and (2) presence of paper stain to be visually judged by naked eyes. The results of inspection item (1) were collected and pigeonholed as shown in Table-1 in the next page, and those of inspection item (2) in Table-2 in the same page.

TABLE 1

| Rank (*1) | (Results of Inspection Item 1) | |
|---|---|---|
| | Number of ranked glass pieces of ware 10 | Number of ranked glass pieces of ware 20 |
| A1 | 22 | 5 |
| A2 | 2 | 5 |
| A3 | — | 6 |
| B1 | — | 6 |
| B2 | — | 2 |
| Total | 24 | 24 |

(*1) Glass pieces were ranked from A1 down to B2

TABLE 2

| | (Results of Inspection Item 2) | |
|---|---|---|
| Visible paper stains (*2) | Number of glass pieces in ware 10 | Number of glass pieces in ware 20 |
| present | 2 | 19 |
| absent | 22 | 5 |
| Total | 24 | 24 |

(*2) Glass pieces were separated according to the presence or absence of visible paper stains.

In the inspection of item (1), those glass pieces ranked A1 could be quite easily and almost completely removed off of adhering paper stain to the surfaces thereof. The wipe-off of adhering paper stain gradually became difficult, as the rank went down to A2, A3, B1 and B2. At the rank B2, the adhesion of paper stain was strong so that the paper stain could not be removed from the glass surface in any easy way in the attempt to wipe it off and was left in part as it clung thereto.

In the inspection of item (2), in ware 10 no more than two of the 24 glass pieces were observed to have visible paper stains to the eyes of inspector, but in ware 20 as many as nineteen glass pieces had such paper stains.

The present invention may well be applied to the preservation of various flat glasses such as a plate glass and a sheet glass as well as that of flatware such as a window glass and special glasses.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing descripton.

I claim:

1. In a ware for preserving a plurality of flat glass pieces arranged in strata in combination with said glass pieces, the component comprising:
    a plurality of paper sheets each respectively interleaved between said glass pieces;
    a desiccating body in contact with said paper sheets; and
    a sealable wrapper wrapped around said glass pieces, said paper sheets and said desiccating body in a shielding manner to the atmosphere.

2. The improved ware according to claim 1, wherein: said paper sheets have marginal parts thereof projected over the edge of said glass pieces; and said desiccating body is in contact with said marginal parts of said paper sheets.

3. The improved ware according to claim 1, wherein: said desiccating body has a weight substantially proportional to the total one-side surface area of said glass pieces.

4. The improved ware according to claim 1, wherein: said glass pieces are arranged in a standing position to constitute a lot; and said desiccating body is put on the upside of said lot, to be in contact with marginal parts of said paper sheets.

5. The improved ware according to claim 1, wherein: said desiccating body comprises a silica gel; and said wrapper comprises a polyethylene film.

6. A ware according to claim 1 wherein said desiccating body comprises a pouch containing a desiccant.

7. A ware according to claim 1 wherein said wrapper includes a plurality of pouches forming a plurality of desiccating bodies, said pouches each including a desiccant.

* * * * *